US012676354B2

(12) United States Patent
Lee

(10) Patent No.: US 12,676,354 B2
(45) Date of Patent: Jul. 7, 2026

(54) BATTERY COOLING CONTROL SYSTEM AND METHOD THEREOF

(71) Applicants: Hyundai Motor Company, Seoul (KR); Kia Corporation, Seoul (KR)

(72) Inventor: Jung Hyun Lee, Yongin (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 1167 days.

(21) Appl. No.: 17/682,505

(22) Filed: Feb. 28, 2022

(65) Prior Publication Data

US 2023/0089535 A1      Mar. 23, 2023

(30) Foreign Application Priority Data

Sep. 17, 2021    (KR) ........................ 10-2021-0125191

(51) Int. Cl.
*H01M 10/625* (2014.01)
*H01M 10/635* (2014.01)
*H01M 10/6568* (2014.01)

(52) U.S. Cl.
CPC ....... *H01M 10/625* (2015.04); *H01M 10/635* (2015.04); *H01M 10/6568* (2015.04); *H01M 2220/20* (2013.01)

(58) Field of Classification Search
CPC ............. H01M 10/625; H01M 10/635; H01M 10/6568; H01M 10/613; H01M 10/443; H01M 10/448; H01M 10/651
See application file for complete search history.

(56) References Cited

U.S. PATENT DOCUMENTS

| | | | |
|---|---|---|---|
| 2015/0226567 A1* | 8/2015 | North ...................... | B60L 53/30 |
| | | | 701/533 |
| 2020/0076020 A1 | 3/2020 | Ogaki et al. | |

FOREIGN PATENT DOCUMENTS

KR      2021-0076547 A      6/2021

* cited by examiner

*Primary Examiner* — Sarah A. Slifka
(74) *Attorney, Agent, or Firm* — Fox Rothschild LLP

(57) ABSTRACT

A battery cooling control system includes an electric water pump (EWP) that circulates coolant to cool a battery, a chiller that cools the coolant, and a controller electrically connected with the EWP and the chiller. The controller enters a battery cooling control mode to monitor a current temperature of the battery, when battery charging is scheduled, determines the cooling control mode based on the current temperature of the battery, and controls cooling using at least one of the EWP or the chiller depending on the determined cooling control mode.

20 Claims, 4 Drawing Sheets

100

| TEMPERATURE (°C) | 5 ~ 9.9 | | 10 ~ 14.9 | | 15 ~ 19.9 | | 20 ~ 24.9 | | 25 ~ 34.9 | | 35 ~ 49.9 | | 50 ~ | |
|---|---|---|---|---|---|---|---|---|---|---|---|---|---|---|
| Step | Cut-off (V) | CHARGING CURRENT (A) | Cut-off (V) | CHARGING CURRENT (A) | Cut-off (V) | CHARGING CURRENT (A) | Cut-off (V) | CHARGING CURRENT (A) | Cut-off (V) | CHARGING CURRENT (A) | Cut-off (V) | CHARGING CURRENT (A) | Cut-off (V) | CHARGING CURRENT (A) |
| 1 | 3.989 | 89.0 | 3.989 | 122.3 | 3.989 | 144.6 | 3.989 | 177.9 | 3.989 | 222.4 | 3.989 | 263.5 | MAP | MAP |
| 2 | 10sec | 77.8 | 10sec | 111.2 | 10sec | 133.4 | 10sec | 155.7 | 10sec | 189.0 | 10sec | 234.6 | MAP | MAP |
| 3 | 3.974 | 77.8 | 3.974 | 111.2 | 3.974 | 133.4 | 3.974 | 155.7 | 3.974 | 189.0 | 3.974 | 234.6 | MAP | MAP |
| 4 | 10sec | 66.7 | 10sec | 89.0 | 10sec | 111.2 | 10sec | 133.4 | 10sec | 166.8 | 10sec | 204.6 | MAP | MAP |
| 5 | 3.965 | 66.7 | 3.965 | 89.0 | 3.965 | 111.2 | 3.965 | 133.4 | 3.965 | 166.8 | 3.965 | 204.6 | MAP | MAP |
| 6 | 3.978 | 66.7 | 3.978 | 89.0 | 3.978 | 111.2 | 3.978 | 122.3 | 3.978 | 144.6 | 3.978 | 175.7 | MAP | MAP |
| 7 | 4.023 | 55.6 | 4.023 | 66.7 | 4.023 | 89.0 | 4.023 | 100.1 | 4.023 | 122.3 | 4.023 | 146.8 | MAP | MAP |
| 8 | 4.06 | | 4.06 | | 4.06 | 55.6 | 4.06 | 66.7 | 4.06 | 89.0 | 4.06 | 116.8 | MAP | MAP |
| 9 | 10sec | | 10sec | | 10sec | 44.5 | 10sec | 55.6 | 10sec | 66.7 | 10sec | 87.8 | MAP | MAP |
| 10 | 4.06 | | 4.06 | | 4.06 | 44.5 | 4.06 | 55.6 | 4.06 | 66.7 | 4.06 | 87.8 | MAP | MAP |
| 11 | MAINTAIN CV AS STEP-7 CUT-OFF VOLTAGE UNTIL TEMPERATURE SLOW CHARGING CURRENT | | | | MAINTAIN CV AS STEP-10 CUT-OFF VOLTAGE UNTIL TEMPERATURE SLOW CHARGING CURRENT | | | | | | | | | |

FIG. 2

BATTERY COOLING CONTROL SYSTEM AND METHOD THEREOF

CROSS-REFERENCE TO RELATED APPLICATION

This application claims under 35 U.S.C. § 119(a) the benefit of Korean Patent Application No. 10-2021-0125191, filed in the Korean Intellectual Property Office on Sep. 17, 2021, the entire contents of which are incorporated herein by reference.

BACKGROUND

(a) Technical Field

The present disclosure relates to a battery cooling control system and method, more particularly, to the system and method for cooling a battery in an electric vehicle.

(b) Description of the Related Art

As the spread of electrified vehicles such as electric vehicles increases and the cruising distance of electric vehicles increases, user complaints regarding a charging time are increasing. An optimal charging speed of the battery is possible in only a condition where charging is performed using an ultra high power charger in an optimal battery temperature and a battery state of charge (SOC), and the charging time is much longer in actual use conditions. Thus, there is a need to control a battery temperature to have an optimal charging speed except for a charger output.

An existing technology performs battery cooling control in terms of battery protection (durability), but performs charging in a state where an optimal charging temperature is not satisfied due to an increase in battery temperature according to the use of the battery when connecting the vehicle to the charger due to a decrease in SOC while driving.

SUMMARY

An aspect of the present disclosure provides a battery cooling control system for reflecting a battery charging map characteristic for each vehicle type and considering both battery current maximization and battery durability to perform battery cooling control and a method thereof.

Furthermore, another aspect of the present disclosure provides a battery cooling control system for controlling a battery temperature by means of only battery cooling control without dealing with a scheme of increasing a battery temperature using a separate positive temperature coefficient (PTC) heater and controlling an optimal temperature and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a battery cooling control system may include an electric water pump (EWP) that circulates coolant to cool a battery, a chiller that cools the coolant, and a controller electrically connected with the EWP and the chiller. The controller may enter a battery cooling control mode to monitor a current temperature of the battery, when battery charging is scheduled, may determine the cooling control mode based on the current temperature of the battery, and may control cooling using at least one of the EWP or the chiller depending on the determined cooling control mode.

The controller may enter a first cooling control mode to control a driving revolution per minute (RPM) of the EWP with reference to a previously stored cooling map depending on a change in temperature of the battery, when the current temperature of the battery is greater than or equal to a first reference temperature. The first reference temperature may be a temperature for having a maximum charging current based on a battery state of charge (SOC).

The controller may start driving of the EWP and may stop driving the chiller, when entering the first cooling control mode.

The controller may enter a second cooling control mode to control the EWP and the chiller, when the current temperature of the battery is greater than or equal to a second reference temperature, in the first cooling control mode. The second reference temperature may be a criterion for determining whether to drive the chiller.

The controller may maintain the second cooling control mode or may switch to the first cooling control mode based on a result of comparing the current temperature of the battery with the second reference temperature, in the second cooling control mode.

The controller may calculate a target RPM for maintaining the current temperature of the battery as the first reference temperature, when entering the second cooling control mode, and may control a driving RPM of the chiller based on the target RPM.

The controller may suppress driving of the EWP and the chiller, when the current temperature of the battery is less than the first reference temperature.

The controller may maintain the second cooling control mode, when the current temperature of the battery is greater than or equal to the second reference temperature, in the second cooling control mode, and may switch from the second cooling control mode to the first cooling control mode, when the current temperature of the battery is less than the second reference temperature.

The battery cooling control system may further include a navigator that searches for a charging station based on a battery SOC and a driving route and sets the searched charging station to a charging destination, when the battery SOC is less than or equal to a predetermined threshold while driving or when there is a request by a user. The controller may calculate a remaining driving distance to the charging destination and a charging destination arrival time based on a current position of a vehicle.

The controller may stop battery cooling control, when the vehicle arrives at the charging destination.

According to another aspect of the present disclosure, a battery cooling control method may include entering a battery cooling control mode to monitor a current temperature of a battery, when battery charging is scheduled, determining a cooling control mode based on the current temperature of the battery, and controlling cooling using at least one of an EWP or a chiller depending on the cooling control mode.

The determining of the cooling control mode may include determining the cooling control mode as a first cooling control mode, when the current temperature of the battery is greater than or equal to a first reference temperature, determining the cooling control mode as a second cooling control mode, when the current temperature of the battery is greater than or equal to a second reference temperature, in the first cooling control mode, and maintaining the second cooling control mode or switching to the first cooling control mode based on a result of comparing the current temperature of the battery with the second reference temperature, in the second cooling control mode.

The first reference temperature may be a temperature for having a maximum charging current based on a battery SOC. The second reference temperature may be a criterion for determining whether to drive the chiller.

The controlling of the cooling may include starting driving of the EWP and stopping driving the chiller, when entering the first cooling control mode.

The controlling of the cooling may further include controlling a driving RPM of the EWP with reference to a previously stored cooling map depending on a change in temperature of the battery in the first cooling control mode.

The controlling of the cooling may include calculating a target RPM for maintaining the current temperature of the battery as the first reference temperature when entering the second cooling control mode and controlling a driving RPM of the chiller based on the target RPM.

The battery cooling control method may further include suppressing driving of the EWP and the chiller, when the current temperature of the battery is less than the first reference temperature.

The maintaining of the second cooling control mode or the switching to the first cooling control mode may include maintaining the second cooling control mode, when the current temperature of the battery is greater than or equal to the second reference temperature, and switching from the second cooling control mode to the first cooling control mode, when the current temperature of the battery is less than the second reference temperature.

The monitoring of the current temperature of the battery may include searching, by a navigator, for a charging station based on a battery SOC and a driving route and setting, by the navigator, the searched charging station to a charging destination, when a battery SOC is less than or equal to a predetermined threshold while driving or when there is a request by a user, and calculating a remaining driving distance to the charging destination and a charging destination arrival time based on a current position of a vehicle.

The battery cooling control method may further include stopping battery cooling control, when the vehicle arrives at the charging destination.

BRIEF DESCRIPTION OF THE DRAWINGS

The above and other objects, features and advantages of the present disclosure will be more apparent from the following detailed description taken in conjunction with the accompanying drawings:

FIG. 2 is a drawing illustrating a battery charging map according to embodiments of the present disclosure;

DETAILED DESCRIPTION

Figure 1:
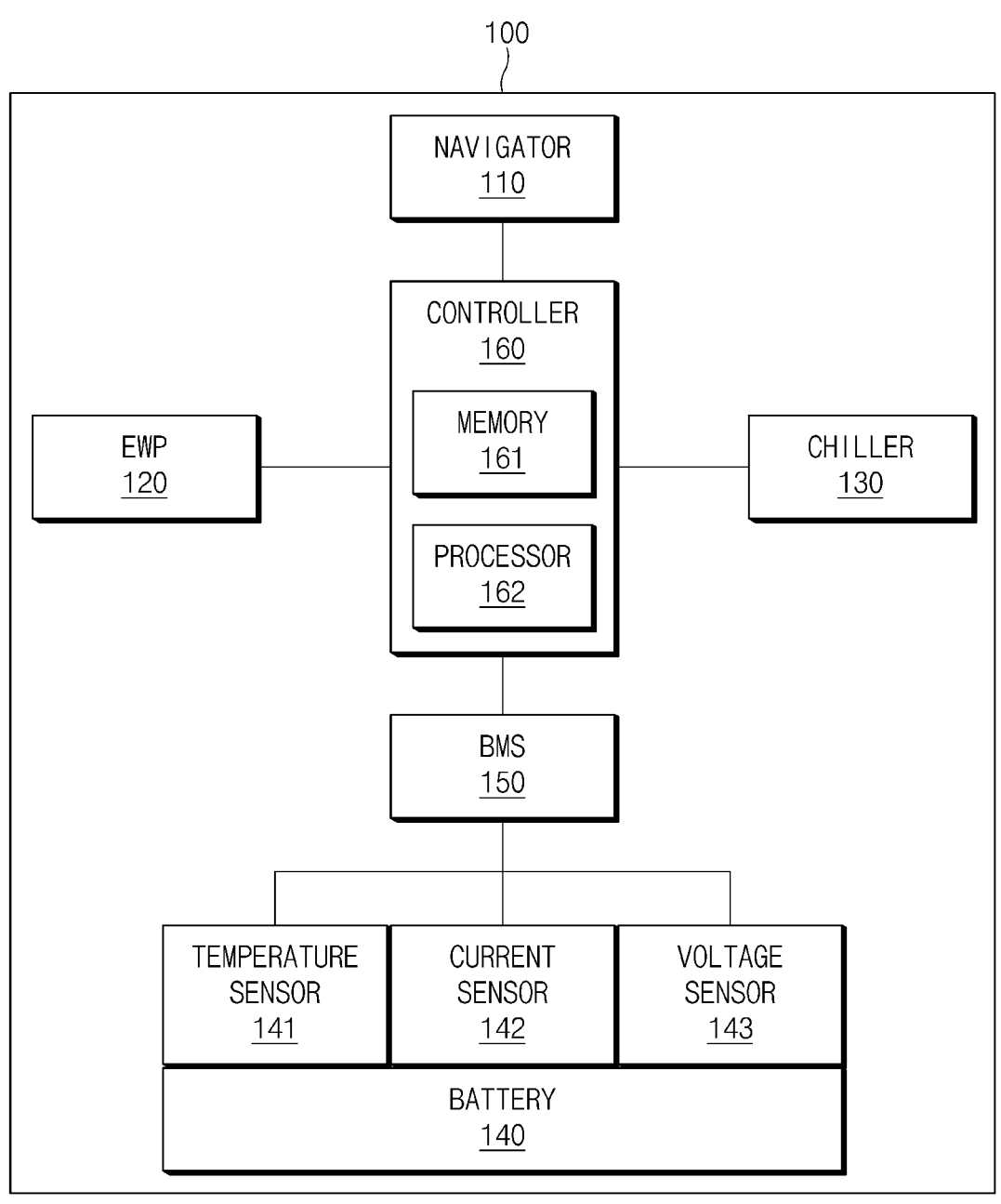
FIG. 1 is a block diagram illustrating a configuration of a battery cooling control system according to embodiments of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Furthermore, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of a battery cooling control system according to embodiments of the present disclosure.

A battery cooling control system 100 may be applied to an electric vehicle having a battery, for example, an electric vehicle (EV), a hybrid electric vehicle (HEV), a plug-in hybrid electric vehicle (PHEV), and a fuel cell vehicle.

As shown in FIG. 1, the battery cooling control system 100 may include a navigator 110, an electric water pump (EWP) 120, a chiller 130, a battery 140, a battery management system (BMS) 150, a controller 160, and the like, which are connected over an in-vehicle network (IVN). Herein, the IVN may be implemented as a controller area network (CAN), a media oriented systems transport (MOST) network, a local interconnect network (LIN), an X-by-Wire (Flexray), and/or the like. Each component may have a communication circuit for performing mutual communication over the IVN.

The navigator 110 may provide a charging station designation (reservation) function based on a driving route. When a battery state of charge (SOC) decreases to a predetermined threshold or less, the navigator 110 may search for a charging station with regard to the driving route and the battery SOC and may set the searched charging station to a charging destination. Furthermore, the navigator 110 may set a specific charging station to a charging destination depending on a user input received from a user interface (e.g., a touch screen). The navigator 110 may transmit a signal (or data or a message) indicating that the charging destination is set to the controller 160.

The navigator 110 may include a memory for storing map data, a global positioning system (GPS) receiver for measuring a vehicle position, a communication circuit for receiving traffic information from the outside, a display (e.g., a touch screen) for overlapping and displaying a vehicle position and a driving route on the map data, a processor for searching for a driving route and guiding a driver along the searched driving route, and/or the like.

The EWP 120 may circulate coolant along a coolant flow path (line) using a pressure action. The EWP 120 may circulate coolant to cool the battery 140. The EWP 120 may adjust a revolution per minute (RPM) of a drive motor under an instruction of the controller 160.

The chiller 130 may cool coolant, which may be an air conditioner compressor. The chiller 130 may adjust an RPM of the drive motor depending on a control command of the controller 160.

The battery 140 may be a high voltage battery which store electrical energy. The battery 140 may supply power necessary for driving of the vehicle. A temperature sensor 141, a current sensor 142, a voltage sensor 143, and/or the like may be mounted on such a battery 140. The temperature sensor 141 may measure a current temperature T of the battery 140. The current sensor 142 may measure a charging current of the battery 140, and the voltage sensor 143 may measure a charging voltage of the battery 140.

The BMS 150 may receive the temperature, the current, and/or the voltage of the battery 140 from the temperature sensor 141, the current sensor 142, and/or the voltage sensor 143. The BMS 150 may monitor a battery state, a battery state of charge (SOC), and/or the like based on the temperature, the current, and the voltage of the battery 140. The BMS 150 may transmit the received temperature, current, and voltage of the battery 140 to the controller 160. The BMS 150 may prevent overcharging, overdischarging, or the like of the battery 140 to protect the battery 140.

The BMS 150 may include a memory and at least one processor. A charging map, a cooling map, and the like may be stored in the memory, and a charging control algorithm, a cooling control algorithm, and/or the like may be stored in the memory. A battery charging characteristic according to a battery temperature may be defined in the charging map, and a driving RPM of each of the EWP 120 and the chiller 130 according to a battery temperature may be defined in the cooling map. The processor of the BMS 150 may perform charging control and/or cooling control under control of the controller 160.

The controller 160 may perform charging preparation cooling control for controlling a battery temperature to an optimal charging temperature to minimize a time taken to charge the battery 140 of the vehicle. The controller 160 may be a vehicle control unit (VCU) for controlling the overall operation of the vehicle. The controller 160 may include a memory 161 and at least one processor 162. The memory 161 may be a non-transitory storage medium which stores instructions executed by the processor 162. The memory 161 may include at least one of storage media such as a flash memory, a hard disk, a solid state disk (SSD), a secure digital (SD) card, a random access memory (RAM), a static RAM (SRAM), a read only memory (ROM), a programmable ROM (PROM), an electrically erasable and programmable ROM (EEPROM), an erasable and programmable ROM (EPROM), an embedded multimedia card (eMMC) and/or a universal flash storage (UFS). The processor 162 may perform the overall control of the controller 160. The processor 162 may include at least one of processing devices such as an application specific integrated circuit (ASIC), a digital signal processor (DSP), programmable logic devices (PLD), field programmable gate arrays (FPGAs), a central processing unit (CPU), microcontrollers, and/or microprocessors.

When battery charging is scheduled while driving, the processor 162 may enter a battery cooling control mode. In other words, when the battery charging is planned, the processor 162 may switch an operation mode to a cooling control mode. When the battery SOC decreases to a predetermined threshold or less or when visiting of a charging station is set (or reserved) by a user, the processor 162 may determine to start (initiate) battery cooling control.

As an example, when the battery SOC decreases to the predetermined threshold or less, the processor 162 may request the navigator 110 to search for a charging station. The navigator 110 may search for a charging station with regard to a driving route, a battery SOC, and the like and may set the searched charging station to a charging destination (or a charging target point). As another example, the navigator 110 may set a specific charging station to a charging destination depending on a user input received from a user interface (e.g., a touch screen). When the signal (or the message or the like) indicating that the charging destination is set, which is transmitted from the navigator 110, is received, the processor 162 may determine that battery charging is scheduled.

When the charging destination is set, the processor 162 may calculate a remaining driving distance from the current position of the vehicle to the charging destination, a charging destination arrival time, and the like. After calculating the remaining driving distance, the charging destination arrival time, and the like, the processor 162 may enter a battery cooling control mode to initiate battery cooling control (or battery charging optimal temperature control).

Furthermore, the processor 162 may calculate a cooling load based on the remaining driving distance, a current temperature of the battery 140, and the like.

After entering the battery cooling control mode, the processor 162 may compare the current temperature T of the battery 140 with a first reference temperature. The first reference temperature may be a temperature $T_{max}$ for having a maximum charging current based on the battery SOC, which may be a cooling target temperature.

When the current temperature of the battery 140 is less than the first reference temperature, the processor 162 may switch the operation mode to a battery cooling suppression mode. When entering the battery cooling suppression mode, the processor 162 may stop driving the EWP 120 and the chiller 130 to stop battery cooling control. Thereafter, the processor 162 may compare the current temperature of the battery 140 with the first reference temperature to determine whether to stop or maintain battery cooling control as a result of the comparison.

When the current temperature of the battery 140 is greater than or equal to the first reference temperature, the processor 162 may enter a first cooling control mode. The first cooling control mode may be a passive cooling mode of controlling the EWP 120 to cool the battery 140. The processor 162 may initiate driving of the EWP 120 by using the RPM of the EWP 120 as a predetermined initial RPM. In this case, the processor 162 may drive the EWP 120 and may suppress driving of the chiller 130 to increase a battery temperature until arriving at a maximum charging current temperature on a charging map (i.e., a battery temperature area according to battery heating by a fast charging current).

The processor 162 may identify whether a temperature of the battery 140 increases after initiating first cooling control. In other words, the processor 162 may identify whether the temperature of the battery 140 increases in a state where the EWP 120 is driven. When the current temperature of the battery 140 is higher than a previously measured battery temperature (or a previous temperature), the processor 162 may determine that the battery temperature increases.

When the battery temperature increases, the processor 162 may control driving of the EWP 120 based on the cooling map stored in the BMS 150. The processor 162 may control the RPM of the EWP 120 to a target RPM according to the current temperature of the battery 140 with reference to the cooling map. For example, when the battery temperature increases due to battery heating although the battery 140 is cooled due to coolant circulation by the EWP 120, the processor 162 may upwardly control the RPM of the EWP 120.

The processor 162 may identify whether the temperature of the battery 140 increases in a state where the driving of the EWP 120 is initiated. Although driving the EWP 120 to perform battery cooling, the processor 162 may identify whether the temperature of the battery 140 increases.

When the temperature of the battery 140 increases, the processor 162 may identify whether the current temperature T of the battery 140 is greater than or equal to a second reference temperature. The second reference temperature may be a temperature $T_{chiller}$ that serves as a criterion for determining whether to drive the chiller 130.

When the current temperature of the battery 140 is greater than or equal to the second reference temperature, the processor 162 may enter a second cooling control mode. In other words, when the current temperature T of the battery 140 arrives at a chiller driving temperature $T_{chiller}$ which is the second reference temperature, the processor 162 may initiate second cooling control. The second cooling control mode may be an active cooling mode for driving the EWP 120 and the chiller 130 to perform battery cooling. The processor 162 may calculate a target RPM of the chiller 130 for maintaining the current temperature T of the battery 140 as the first reference temperature.

When entering the second cooling control mode, the processor 162 may initiate driving of the chiller 130. The processor 162 may control an RPM (or a driving RPM) of the chiller 130 to a target RPM calculated in a state where an RPM (or a driving RPM) of the EWP 120 is controlled to a target RPM according to the current temperature T of the battery 140. When the battery temperature continuously increases during the second cooling control, the processor 162 may upwardly control the RPM of the chiller 130.

As an example, the processor 162 may control the chiller 130 to perform battery cooling control, may compare the current temperature T of the battery 140 with the second reference temperature, and may maintain the second cooling control mode or may switch to the first cooling control mode based on the compared result. When the operation mode switches from the second cooling control mode to the first cooling control mode, the processor 162 may stop driving the chiller 130.

As another example, when the current temperature of the battery 140 arrives at a cooling target temperature (or a chiller driving stop temperature $T_{chiller\_off}$) while performing the battery cooling control in the second cooling control mode, the processor 162 may stop driving the chiller 130. In this case, the processor 162 may maintain coolant circulation by the driving of the EWP 120.

As another example, when the vehicle arrives at the charging station set to the charging destination during the battery cooling control, the processor 162 may stop the battery cooling control. Thereafter, when the vehicle is connected to a charger, the processor 162 may perform battery charging depending on a predetermined battery charging procedure. In the present embodiment, because a battery charging technology which is well known is used, a detailed description of the battery charging procedure will be omitted.

FIG. 2 is a drawing illustrating a battery charging map according to embodiments of the present disclosure.

A cut-off voltage and a charging current for each battery temperature area and for each charging step may be defined in the charging map. According to the charging map shown in FIG. 2, a battery 140 of FIG. 1 may have a characteristic where it has a maximum charging current in a high temperature area. Thus, to minimize a battery charging time, a battery temperature should be controlled to start charging in a temperature area having the maximum charging current (e.g., converge at 35° C. when considering battery durability).

Figure 3:
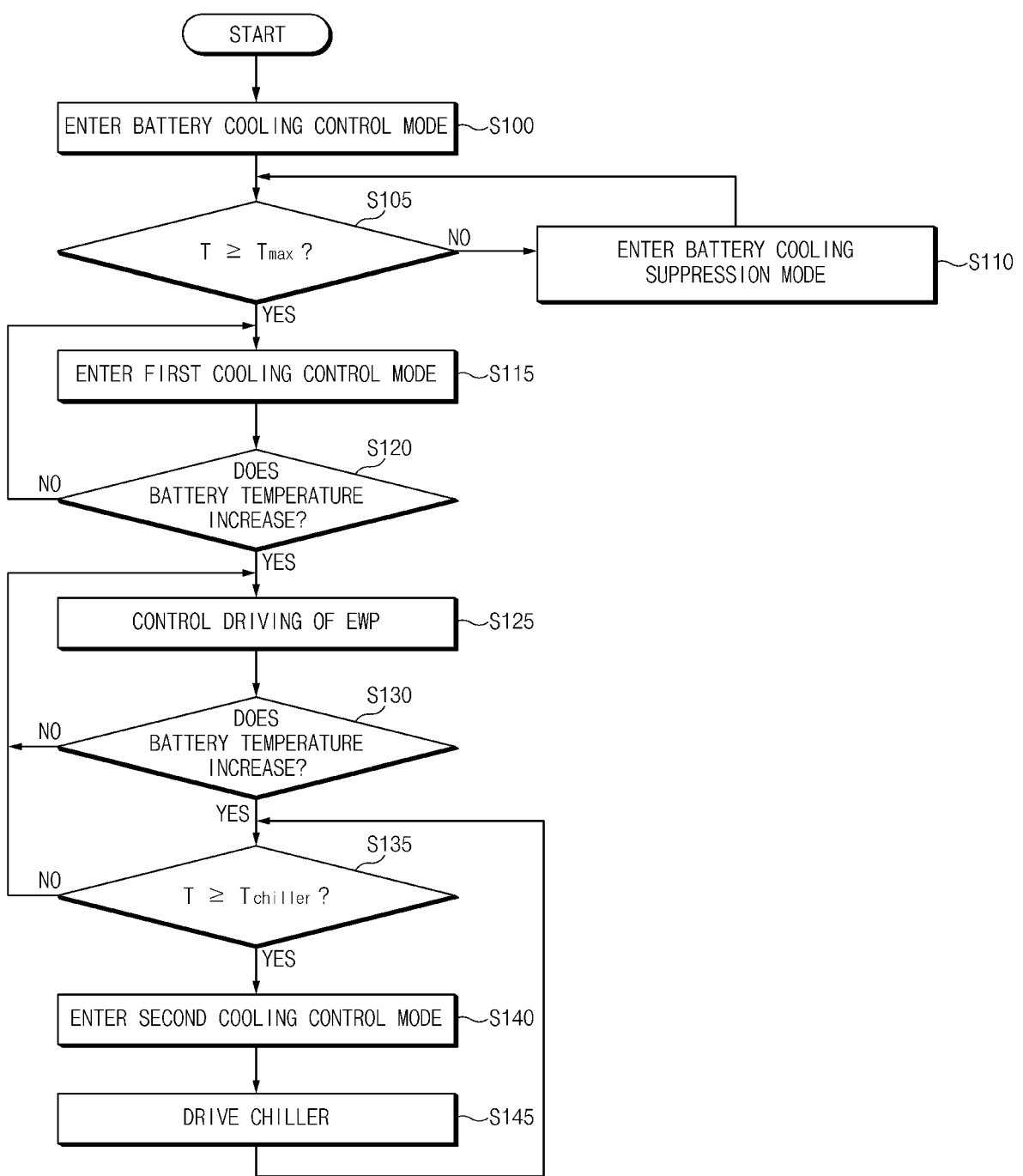
FIG. 3 is a flowchart illustrating a battery cooling control method according to embodiments of the present disclosure.

FIG. 3 is a flowchart illustrating a battery cooling control method according to embodiments of the present disclosure.

Referring to FIG. 3, when battery charging is scheduled (planned) while driving, in S100, a controller 160 of FIG. 1 may enter a battery cooling control mode. When the battery SOC decreases to a predetermined threshold or less or when visiting of a charging station is set (or reserved) by a user, the controller 160 may determine to initiate battery cooling control. As an example, when the battery SOC decreases to the predetermined threshold or less, the controller 160 may request a navigator 110 of FIG. 1 to search for a charging station. The navigator 110 may search for a charging station with regard to a driving route, a battery SOC, and the like and may set the searched charging station to a charging destination. As another example, the navigator 110 may set a specific charging station to a charging destination depending on a user input received from a user interface (e.g., a touch screen). When the signal indicating that the charging destination is set, which is transmitted from the navigator 110, is received, the controller 160 may determine that battery charging is scheduled.

After entering the battery cooling control, in S105, the controller 160 may compare a current temperature T of a battery 140 of FIG. 1 with a first reference temperature $T_{max}$. The first reference temperature $T_{max}$ may be a temperature area for having a maximum charging current based on the battery SOC.

When the current temperature T of the battery 140 is less than the first reference temperature $T_{max}$, in S110, the controller 160 may enter a battery cooling suppression mode. The controller 160 may stop driving an EWP 120 and a chiller 130 of FIG. 1 to stop battery cooling control. Thereafter, the controller 160 may return to S105 and may compare the current temperature T of the battery 140 with the first reference temperature $T_{max}$ to determine whether to stop or maintain battery cooling control based on the compared result.

When the current temperature T of the battery 140 is greater than or equal to the first reference temperature $T_{max}$, in S115, the controller 160 may enter a first cooling control mode. The controller 160 may initiate driving of the EWP 120 by using the RPM of the EWP 120 as a predetermined initial RPM when initiating first cooling control.

After entering the first cooling control mode, in S120, the controller 160 may identify whether a temperature of the battery 140 increases. In other words, the controller 160 may identify whether the temperature of the battery 140 increases in a state where the EWP 120 is driven. When the current temperature of the battery 140 is higher than a previous temperature, the controller 160 may determine that the battery temperature increases.

When the battery temperature increases, in S125, the controller 160 may control driving of the EWP 120 based on a cooling map stored in a BMS 150 of FIG. 1. The controller 160 may control the RPM of the EWP 120 to a target RPM according to the current temperature T of the battery 140 with reference to the cooling map. When the battery temperature increases, the controller 160 may upwardly control the RPM of the EWP 120.

In S130, the controller 160 may identify whether the temperature of the battery 140 increases. The controller 160 may identify whether the temperature of the battery 140 continuously increases although controlling the driving of the EWP 120.

When the temperature of the battery 140 increases, in S135, the controller 160 may identify whether the current temperature T of the battery 140 is greater than or equal to a second reference temperature $T_{chiller}$. The controller 160 may identify whether the current temperature T of the battery 140 arrives at the second reference temperature $T_{chiller}$ which is a chiller driving temperature.

When the current temperature T of the battery 140 is greater than or equal to the second reference temperature $T_{chiller}$, in S140 controller 160 may enter a second cooling control mode. The controller 160 may calculate a target RPM of the chiller 130 for maintaining the current temperature T of the battery 140 as the first reference temperature $T_{max}$.

When entering the second cooling control mode, in S145, the controller 160 may initiate driving of the chiller 130. The controller 160 may control an RPM of the chiller 130 to the target RPM calculated in a state where the RPM of the EWP 120 is controlled to a target RPM according to the current temperature T of the battery 140. When the battery temperature continuously increases during second cooling control, the controller 160 may upwardly control the RPM of the chiller 130.

As an example, the controller 160 may control the chiller 130 to perform battery cooling control, may return to S135 to compare the current temperature T of the battery 140 with the second reference temperature $T_{chiller}$, and may maintain the second cooling control mode or switch to the first cooling control mode based on the compared result. When the operation mode switches from the second cooling control mode to the first cooling control mode, the controller 160 may stop driving the chiller 130.

As another example, when the current temperature T of the battery 140 arrives at a cooling target temperature (i.e., the second reference temperature) while performing the battery cooling control in the second cooling control mode, the controller 160 may stop driving the chiller 130. In this case, the controller 160 may maintain coolant circulation by the driving of the EWP 120.

As another example, when the vehicle arrives at a charging station set to a charging destination during the battery cooling control, the controller 160 may stop the battery cooling control. Thereafter, when the vehicle is connected to a charger, the controller 160 may perform battery charging depending on a predetermined battery charging procedure. In the present embodiment, because a battery charging technology which is well known is used, a detailed description of the battery charging procedure will be omitted.

Figure 4:
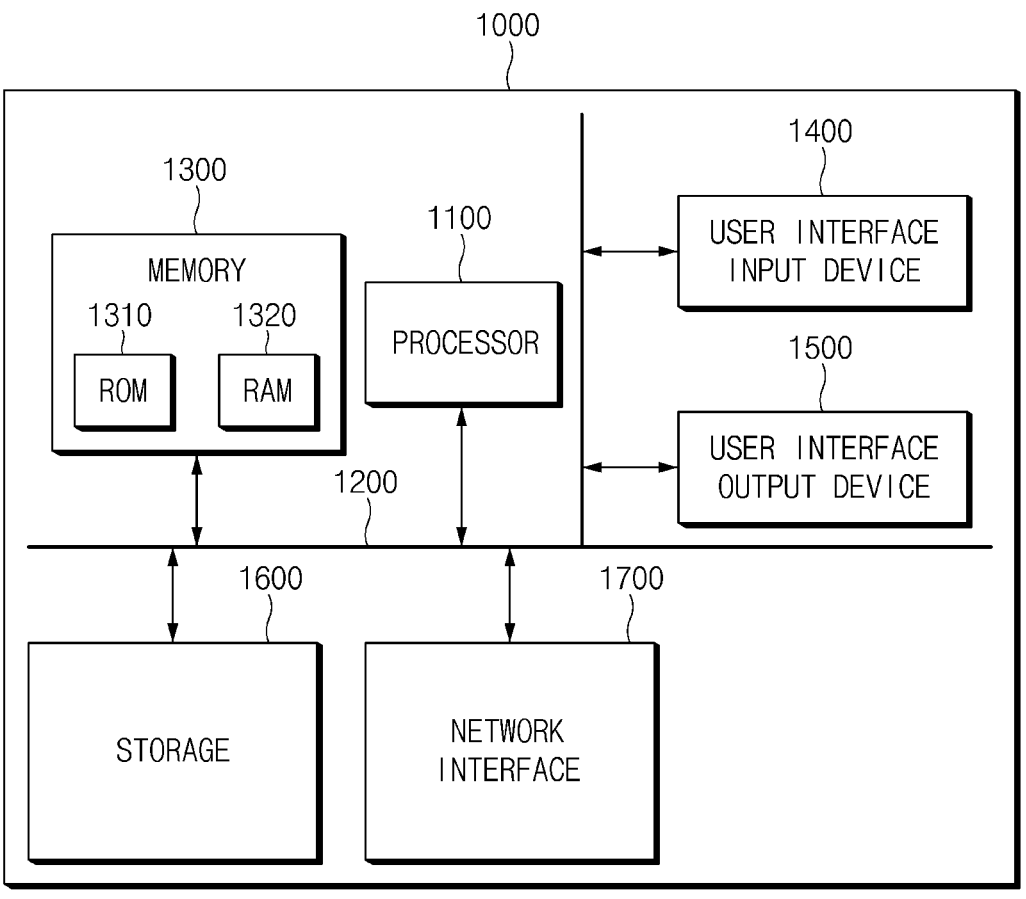
FIG. 4 is a block diagram illustrating a computing system for executing a battery cooling control method according to embodiments of the present disclosure.

FIG. 4 is a block diagram illustrating a computing system for executing a battery cooling control method according to embodiments of the present disclosure.

Referring to FIG. 4, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100. The processor 1100 may read out information from the storage medium and may write information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to embodiments of the present disclosure, the battery cooling control system may reflect a battery charging map characteristic for each vehicle type and may consider both battery current maximization and battery durability to perform battery cooling control, thus charging the battery at an optimal charging temperature.

Furthermore, according to embodiments of the present disclosure, the battery cooling control system may control a battery temperature to an optimal charging temperature before fast charging without adding separate hardware in an electric vehicle which does not have a heating system such as a PTC heater.

Furthermore, according to embodiments of the present disclosure, the battery cooling control system may charge the battery at an optimal charging temperature to minimize a battery charging time, thus reduce inconvenience of the user due to a charging standby time.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present invention are not intended to limit the technical spirit of the present invention, but provided only for the illustrative purpose. The scope of the present disclosure should be construed based on the accompanying claims, and all the technical ideas within the scope equivalent to the claims should be included in the scope of the present disclosure.

What is claimed is:

1. A battery cooling control system, comprising:
an electric water pump (EWP) configured to circulate coolant to cool a battery;
a chiller configured to cool the coolant; and
a controller electrically connected with the EWP and the chiller,
wherein the controller is configured to:
enter a battery cooling control mode to monitor a current temperature of the battery, when battery charging is scheduled,
determine the cooling control mode based on the current temperature of the battery, and
control cooling using at least one of the EWP or the chiller depending on the determined cooling control mode.

2. The battery cooling control system of claim 1, wherein the controller enters a first cooling control mode to control a driving revolution per minute (RPM) of the EWP with reference to a previously stored cooling map depending on a change in temperature of the battery, when the current temperature of the battery is greater than or equal to a first reference temperature, and
wherein the first reference temperature is a temperature for having a maximum charging current based on a battery state of charge (SOC).

3. The battery cooling control system of claim 2, wherein the controller starts driving of the EWP and stops driving the chiller, when entering the first cooling control mode.

4. The battery cooling control system of claim 2, wherein the controller enters a second cooling control mode to control the EWP and the chiller, when the current temperature of the battery is greater than or equal to a second reference temperature, in the first cooling control mode, and
wherein the second reference temperature is a criterion for determining whether to drive the chiller.

5. The battery cooling control system of claim 4, wherein the controller maintains the second cooling control mode or switches to the first cooling control mode based on a result of comparing the current temperature of the battery with the second reference temperature, in the second cooling control mode.

6. The battery cooling control system of claim 4, wherein the controller calculates a target RPM for maintaining the current temperature of the battery as the first reference temperature, when entering the second cooling control mode, and controls a driving RPM of the chiller based on the target RPM.

7. The battery cooling control system of claim 4, wherein the controller maintains the second cooling control mode, when the current temperature of the battery is greater than or equal to the second reference temperature, in the second cooling control mode, and switches from the second cooling control mode to the first cooling control mode, when the current temperature of the battery is less than the second reference temperature.

8. The battery cooling control system of claim 4, wherein the controller suppresses driving of the EWP and the chiller, when the current temperature of the battery is less than the first reference temperature.

9. The battery cooling control system of claim 1, further comprising:
a navigator configured to search for a charging station based on a battery SOC and a driving route and set the searched charging station to a charging destination, when the battery SOC is less than or equal to a predetermined threshold while driving or when there is a request by a user,
wherein the controller calculates a remaining driving distance to the charging destination and a charging destination arrival time based on a current position of a vehicle.

10. The battery cooling control system of claim 9, wherein the controller stops battery cooling control, when the vehicle arrives at the charging destination.

11. A battery cooling control method, comprising:
entering, by a controller, a battery cooling control mode to monitor a current temperature of a battery, when battery charging is scheduled;
determining, by the controller, the cooling control mode based on the current temperature of the battery; and
controlling, by the controller, cooling using at least one of an EWP or a chiller depending on the cooling control mode.

12. The battery cooling control method of claim 11, wherein determining the cooling control mode includes:
determining, by the controller, the cooling control mode as a first cooling control mode, when the current temperature of the battery is greater than or equal to a first reference temperature;
determining, by the controller, the cooling control mode as a second cooling control mode, when the current temperature of the battery is greater than or equal to a second reference temperature, in the first cooling control mode; and
maintaining, by the controller, the second cooling control mode or switching to the first cooling control mode based on a result of comparing the current temperature of the battery with the second reference temperature, in the second cooling control mode.

13. The battery cooling control method of claim 12, wherein the first reference temperature is a temperature for having a maximum charging current based on a battery SOC, and
wherein the second reference temperature is a criterion for determining whether to drive the chiller.

14. The battery cooling control method of claim 12, wherein controlling the cooling includes:

starting, by the controller, driving of the EWP and stopping driving the chiller, when entering the first cooling control mode.

15. The battery cooling control method of claim 14, wherein controlling the cooling further includes:

controlling, by the controller, a driving RPM of the EWP with reference to a previously stored cooling map depending on a change in temperature of the battery in the first cooling control mode.

16. The battery cooling control method of claim 12, wherein controlling the cooling includes:

calculating, by the controller, a target RPM for maintaining the current temperature of the battery as the first reference temperature when entering the second cooling control mode; and controlling, by the controller, a driving RPM of the chiller based on the target RPM.

17. The battery cooling control method of claim 12, further comprising:

suppressing, by the controller, driving of the EWP and the chiller, when the current temperature of the battery is less than the first reference temperature.

18. The battery cooling control method of claim 12, wherein maintaining the second cooling control mode or switching to the first cooling control mode includes:

maintaining, by the controller, the second cooling control mode, when the current temperature of the battery is greater than or equal to the second reference temperature; and switching, by the controller, from the second cooling control mode to the first cooling control mode, when the current temperature of the battery is less than the second reference temperature.

19. The battery cooling control method of claim 11, wherein monitoring the current temperature of the battery includes:

searching, by a navigator, for a charging station based on a battery SOC and a driving route and setting, by the navigator, the searched charging station to a charging destination, when a battery SOC is less than or equal to a predetermined threshold while driving or when there is a request by a user; and calculating, by the controller, a remaining driving distance to the charging destination and a charging destination arrival time based on a current position of a vehicle.

20. The battery cooling control method of claim 19, further comprising:

stopping, by the controller, battery cooling control, when the vehicle arrives at the charging destination.

* * * * *